Sept. 25, 1962

J. B. KRIPKE ETAL 3,055,993

PROGRAM CONTROLLER

Filed April 6, 1960

INVENTORS
JOSEPH B. KRIPKE
MARK R. ROWE
ROGER C. BRENDEMUEHL
BY Carl A. Stickel
THEIR ATTORNEY

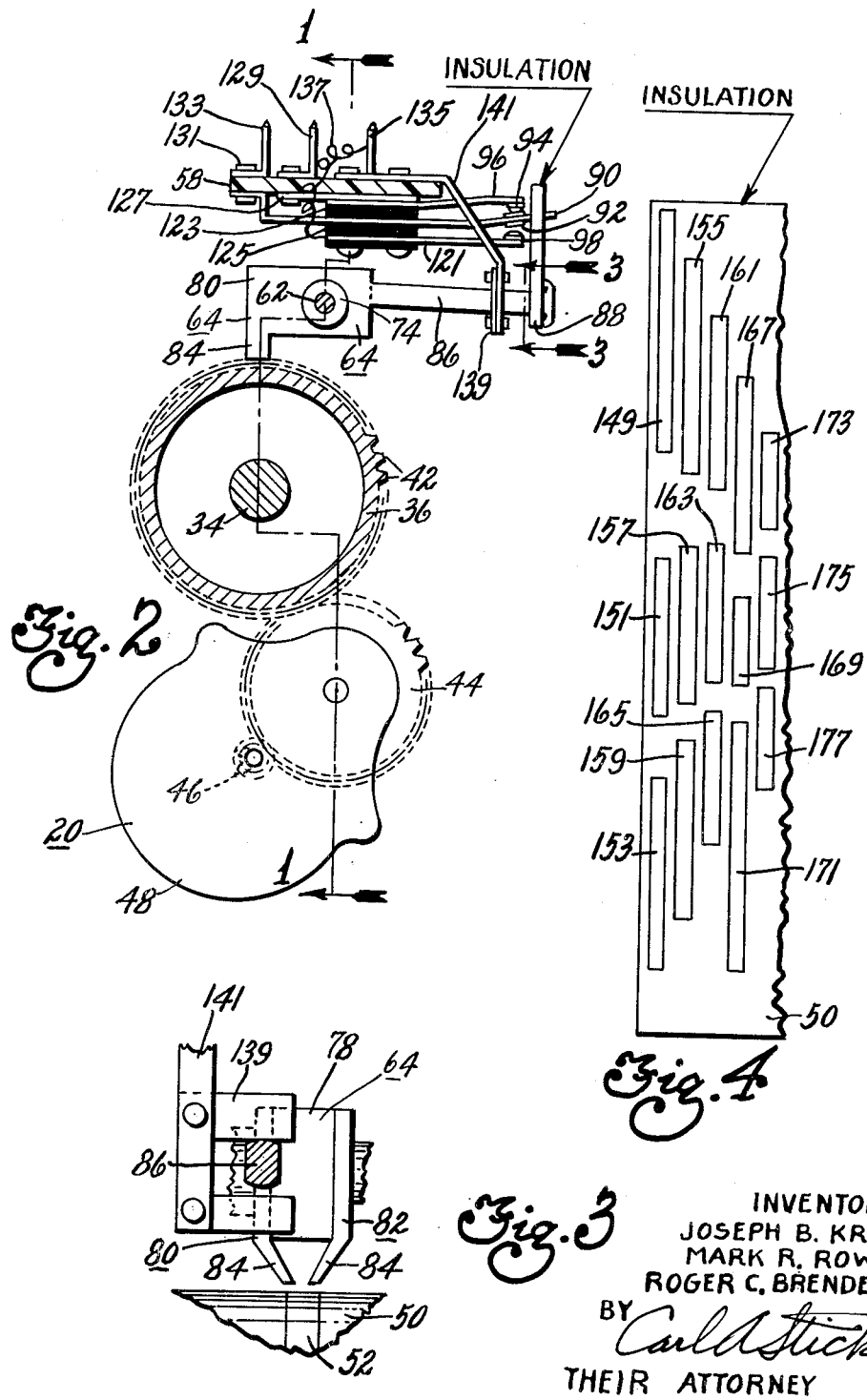

United States Patent Office 3,055,993
Patented Sept. 25, 1962

3,055,993
PROGRAM CONTROLLER
Joseph B. Kripke, Milwaukee, Wis., Mark R. Rowe, Cincinnati, Ohio, and Roger C. Brendemuehl, Milwaukee, Wis., assignors to General Motors Corporation, Detroit, Mich., a corporation of Delaware
Filed Apr. 6, 1960, Ser. No. 20,288
5 Claims. (Cl. 200—33)

This invention relates to a magnetically operated program control and more particularly to a magnetically operable program controller, such as may be used on an automatic washer and similar applications, in which cycles of several different variations can be readily obtained.

Present tendencies require controls to be more completely automatic and is causing program controllers to be more complex. This makes them costly and more liable to failure. Contact difficulties are increased and more powerful timing drive motors are required.

It is an object of this invention to provide a complex program controller in which friction is minimized and the power requirements are lowered.

It is another object of this invention to provide a complex program controller in which wear and contact difficulties are minimized.

It is another object of this invention to provide a complex program controller in which a number of different automatic cycles may be readily selected.

It is another object of this invention to provide a magnetic program controller in which a plurality of contact members are magnetically actuated at desired times according to a preselected program.

These and other objects are attained in the forms shown in the drawings in which a program drum of nonmagnetic material is provided with five different sets of segments of magnetic material in accordance with five desired automatic programs. When any one of these segments of magnetic material is adjacent to but out of contact with a magnetic actuator, the control device or contact device is actuated from the one position to another. The magnetic actuator includes a set of pole pieces provided on opposite faces of a permanent magnet. In operation, the drum is slowly rotated by a timing motor to operate the control devices which are located in a plurality of axial positions relative to the drum. A number of segments of different length may be placed side by side and a means is provided for laterally shifting the drum relative to the control devices so as to select different programs.

Further objects and advantages of the present invention will be apparent from the following description, reference being had to the accompanying drawings wherein preferred embodiments of the present invention are clearly shown.

In the drawings:

FIGURE 2 is a transverse irregular vertical sectional view taken substantially along the line 2—2 of FIGURE 1;

FIGURE 3 is a fragmentary transverse sectional view taken substantially along the line 3—3 of FIGURE 2; and FIGURE 4 is a development of a portion of the drum showing one possible arrangement of the segments of magnetic material therein.

Figure 1:
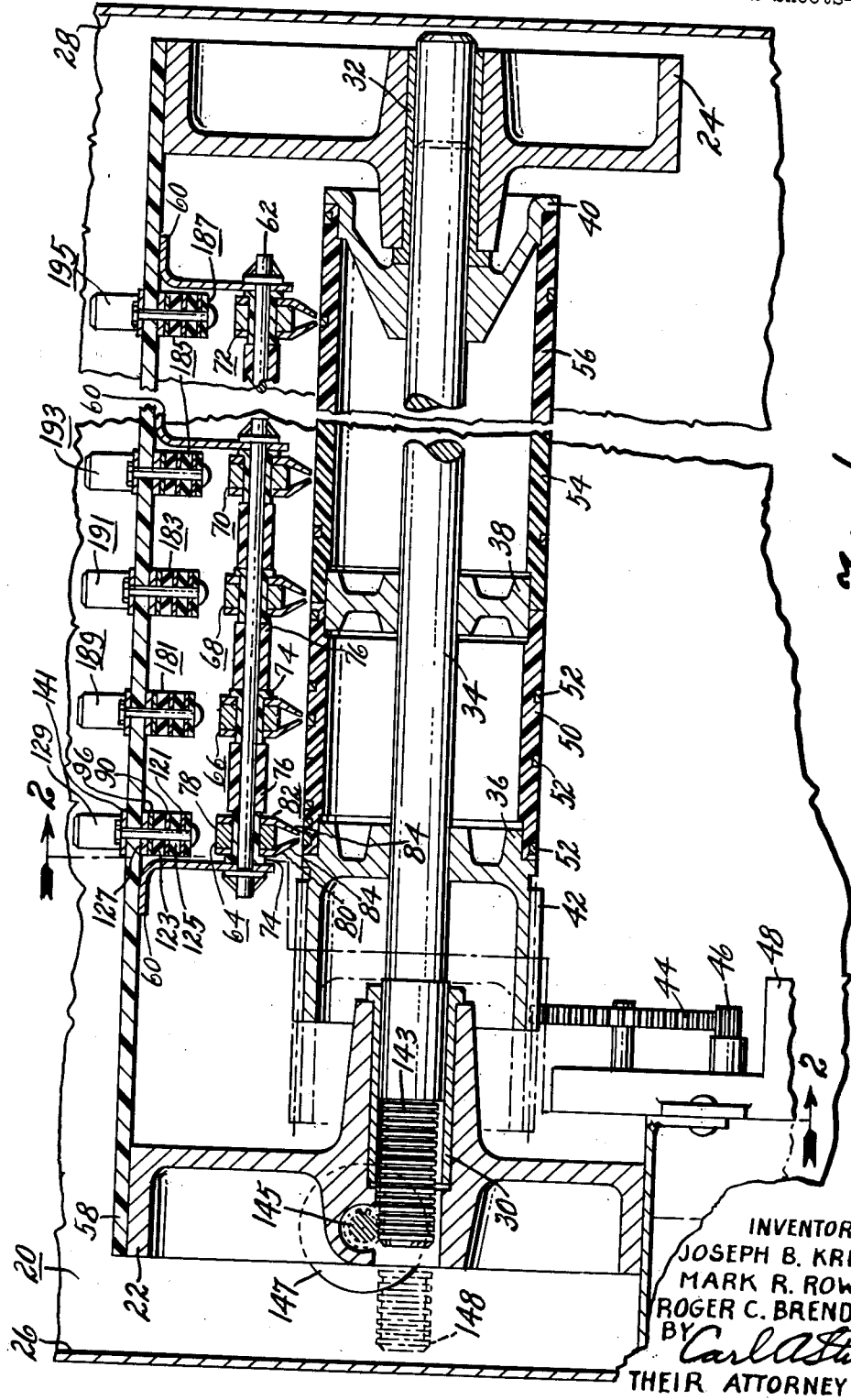
FIGURE 1 is an irregular vertical sectional view of a program controller embodying one form of our invention taken substantially along the line 1—1 of FIGURE 2.

Referring now particularly to FIGURE 1, there is shown, partly diagrammatically, a program controller 20, such as may be used for controlling an automatic washer or similar device. This controller includes side frame members 22 and 24 supported by the walls 26 and 28. These frame members 22 and 24 include the bearings 30 and 32 which both slidably and rotatably support the drum shaft 34. The drum shaft 34 has fixed thereon the circular supporting members 36, 38 and 40. The supporting member 36 is provided with long axially extending gear teeth 42. These gear teeth 42 mesh with the gear 44 driven by the pinion 46 from the timing drive motor 48 supported by the frame member 22. The support members 36 and 38 support the cylindrical drum section 50 of a suitable electrical insulating plastic containing embedded therein a plurality of segments 52 of magnetic material, such as soft iron or steel. These are arranged in six series according to six desired washing programs suitably arranged for different fabrics. As shown, there can be provided six different programs for each set of contact members. This is done by arranging the various programs into series of magnetic segments of suitable number, length and circumferential spacing arranged in circles located side by side and spaced from each other. Each of the circles includes a series of segments of the magnetic material of uniform width and selected number, length and circumferential spacing arranged to provide a program as illustrated in FIGURE 4. Between the supports 38 and 40 are additional cylinders 54 and 56 of similar plastic material supported on these supports and intervening supports to provide as many cooperating contacts and related series of magnetic segments as is necessary to properly control the machine.

A beam of plastic or other nonelectrical or nonmagnetic material 58 is supported by and extends between the supports 22 and 24. This beam has connected thereto a plurality of depending brackets 60 which support the rods 62 which pivotally support the magnetic actuating means 64, 66, 68, 70 and 72. Each of these actuating means is provided with a bushing, such as the bushing 74, of a suitable plastic which is rotatably mounted on the rod 62. The bushings 74 are spaced by the sleeves 76 of plastic material which likewise surround the rod 62.

Each of the actuating means includes a permanent magnet 78, preferably a piece of oriented barium ferrite of size of one inch by nine-sixteenths of an inch by two-tenths of an inch. Upon the wide flat opposite faces of each of these permanent magnets 78, there are provided two pole pieces, all designated by the reference characters 80 and 82. These pole pieces 80 and 82 each have projecting portions 84 extending toward the drum which converge as shown in FIGURE 1. However, a small gap of about thirty-three thousandths is provided between the extreme ends of the projections 84. The pole pieces 80 are also provided with integral arms 86 extending to and through the lower end of a connector 88 of plastic or other suitable nonmetallic material.

This connector 88 connects with the extreme end of a thin spring contact member 90 having double contacts 92. This spring contact member 90 is preferably biased downwardly with a force of about three and a half ounces. The contact 92 is adapted to engage alternately a spring mounted upper contact 94 mounted upon the end of a leaf spring 96 and a lower contact 98 mounted upon the end of a leaf spring 121. The spring member 90 as well as the leaf springs 96 and 121 are separated by electrical insulation pieces 123 and 125. These are all fastened together by two rivets and mounted on the lower face of the beam 58. The spring member 96 is mounted directly against a conductor bar 127 connecting through the beam 58 with the terminal 129. The spring member 90 is extended beyond the insulation pieces 123 and 125 and connects through a rivet 131 with the terminal 133. A terminal 135 is connected by a suitable pigtail with the spring strip 121. This pigtail is designated by the reference character 137.

To provide a snap action, there is provided a U-shaped stop member 139 of magnetic material which is fastened to the bracket 141 fastened to the beam 58. This U-shaped stop member 139 of magnetic material has its legs extending horizontally on opposite sides of the arm 86 and located so as to stop the movement of the arm 86 when the contact 92 is in contact with either of the contacts 94 or 98 with sufficient allowance of additional movement for deflection of the spring members 96 and 121 to provide the desired contact pressure. The arm 86 is made magnetic by the permanent magnet 78 so that it is magnetically held in either extreme position against the inner faces of the member 139. This provides a simple inexpensive magnetic form of snap action which also provides the desired stop locating means for the actuating means. Switch arrangements 181, 183, 185 and 187 are similar to the switch arrangements shown in FIGURES 2 and 3. They are provided with similar operating connections with the magnetic actuating means 66, 68, 70 and 72 also similar to that shown in FIGURES 2 and 3.

The left end of the drum shaft 34 is provided with annular teeth 143 which mesh with a pinion 145 rotatably mounted within the support 22. This pinion 145 is mounted upon a shaft which is rotatably mounted in the frame 22. This shaft is connected to the knob 147 by which the pinion 145 may be rotated to move the shaft 34 from its full line position to its dotted line position designated by the reference character 148 or to positions in between those shown.

As shown in FIGURE 4, on the drum 50 adjacent the projections 84 of the pole pieces 80, 82 of the actuating means 64 in the first row, there are provided segments of magnetic material, such as soft iron or steel, designated by the reference characters 149, 151 and 153. These segments 149, 151 and 153 provide one desired program for the actuating means 64. Beside these segments 149, 151 and 153 is a second set of segments 155, 157 and 159. These segments 155, 157 and 159 of magnetic material, such as soft iron or steel, provide a second program for the contact device 64. Beside these is a third set of segments of magnetic material designated by the reference characters 161, 163 and 165. These segments 161, 163 and 165 provide a third program for the contact mechanism 64. Beside these is a fourth set of segments of magnetic material designated by the reference characters 167, 169 and 171. This provides a fourth program for the contact mechanism 64. Beside these is a series of segments of magnetic material designated by the reference characters 173, 175 and 177. This latter series of segments provides a fifth program for the contact mechanism 64.

The knob 147 may therefore be turned to turn the pinion 145 to position any of these series of segments in alignment with the projections 84 of the contact mechanism 64 to select any of the five programs provided by these five series of segments on the periphery of the drum cylinder 50. These segments may be arranged to provide any desired program for this contact mechanism 64. Similar programs may be provided in the cylinders 50, 54 and 56 for the other contact mechanisms 66, 68, 70 and 72 which will correlate with the programs shown in FIGURE 4. This provides a simple and convenient arrangement for obtaining a number of different programs for a number of switch mechanisms, such as is required for the control of automatic washing machines, to provide different cycles for various types of clothing and washing loads. There is very little friction since there is no frictional contact between the contact mechanism and the drum.

The actuating means which includes the pole pieces 80, 82 and the permanent magnet 78 is substantially statically balanced upon the rod 62. The spring member 90 normally urges the arm 86 in the downward position to lift the projection 84 away from the drum until the projection 86 rests against the lower stop of the member 139 for which it has a magnetic attraction created by the permanent magnet 78. This keeps the contact 92 pressed against the lower contact 98. When a segment of magnetic material 52 or any of the segments shown in FIGURE 4 come into close relationship with the projection 84, the segments will tend to close the magnetic gap in between the projections 84 of the pole pieces 80 and 82 so that a magnetic attraction will result to cause a counterclockwise pull or force to be applied to the actuating means or lever 64 to cause its rotation about the rod 62 with sufficient force to break with a snap action the magnetic attraction between the extension 86 and the magnetic stop member 139 to carry the spring member 90 upwardly and disengage the contact member 92 from the contact member 98 and bring it into contact with the upper contact 94 with sufficient force and movement to provide proper contact pressure by the deflection of the leaf spring 96. The extension 86 then engages the upper inner face of the stop member 139. This will change the energization of the circuits connected to the terminals 133, 129 and 135 as required by the proper control of the washing machine or other device to be controlled. The other contact devices 181, 183, 185, 187 will be similarly actuated and controlled at suitable times according to their individual requirements in coordination with the control of the contact mechanism 64. They are provided with sets of terminals designated by the reference characters 189, 191, 193 and 195.

While we have shown the drum as having segments of magnetic material embedded in cylinders of plastic material, these segments may also be in the form of projections extending from a one piece drum or a series of rings of soft iron or steel which also will provide a means of magnetically bridging the gap between the projections 84 of the pole pieces 80 and 82.

While the embodiments of the present invention as herein disclosed, constitute preferred forms, it is to be understood that other forms might be adopted.

What is claimed is as follows:

1. A controller including a plurality of segments of magnetic material arranged in a pattern, a control device having an actuating means of magnetic material, means for moving said segments and said actuating means relative to each other with the surfaces of the magnetic material passing adjacent to but out of contact with each other, means for creating a magnetic flux between the magnetic material of the segments and the actuating means to cause actuation of the control device when any of the segments pass adjacent to said actuating means, and a magnetic snap action device magnetically associated with said actuating means for delaying the actuation of said control device until the magnetic flux is strong enough to provide a snap movement.

2. A controller including a plurality of segments of magnetic material arranged in a plurality of parallel patterns, a control device having an actuating means of magnetic material, means for moving said segments and said actuating means relative to each other parallel to said parallel patterns in a predetermined alignment relative to a first axis with the surfaces of the magnetic material passing adjacent to but out of contact with each other, selective means for shifting said segments relative to said actuating means perpendicularly to their normal movement to place said segments in different selective transverse positions to change the alignment, and means for creating a magnetic flux between the magnetic material of the segments and the actuating means to cause actuation of the control device when any of the segments pass adjacent to said actuating means.

3. A controller including a rotatable drum provided with a plurality of segments of magnetic material arranged in a plurality of parallel patterns, each of said parallel patterns being perpendicular to the axis of said drum, a control device having an actuating means of magnetic material adjacent said drum and adjacent to but out of contact with said segments, means for creating a magnetic flux between the magnetic material to the segments and the actuating means to cause actuation of the control device when any of the segments pass adjacent to said actuating means, means for rotating said drum relative to said control device to pass the surfaces of said segments adjacent to actuating means to magnetically operate said actuating means according to the presentation of said segments to operate said control device, and selective means for shifting said drum laterally relative to said control device into different selective lateral positions relative to said control device to place different parallel patterns of said segments in alignment with said actuating means.

4. A controller including a rotatable drum provided on its periphery with a plurality of individual control devices arranged in a plurality of parallel circular patterns, each of said parallel circular patterns being perpendicular to the axis of said drum, a complementary coacting control device coacting with said individual control devices upon the periphery of said drum, selective means for shifting said drum relative to said coacting control device parallel to said axis to place said drum and coacting control device in different selective relative positions in which different parallel circular patterns of said control devices upon said drum are aligned with said coacting control device.

5. A controller including a rotatable drum provided on its periphery with a plurality of individual control devices arranged in a plurality of parallel circular patterns, each of said parallel circular patterns being perpendicular to the axis of said drum, a plurality of complementary coacting control devices each positioned to coact with one of said parallel patterns of control devices at a time, selective means for shifting said drum relative to said coacting control devices parallel to said axis to place said drum and coacting control devices in different selective relative positions in which different parallel circular patterns of said control devices upon said drum are aligned with said coacting control devices.

References Cited in the file of this patent
UNITED STATES PATENTS

| | | |
|---|---|---|
| 2,818,473 | Geder | Dec. 31, 1957 |
| 2,848,569 | Moss et al. | Aug. 19, 1958 |

FOREIGN PATENTS

| | | |
|---|---|---|
| 545,818 | Great Britain | June 15, 1942 |